United States Patent [19]

Hashimoto

[11] Patent Number: 5,420,913

[45] Date of Patent: May 30, 1995

[54] DEVICE FOR MAKING VIDEOTAPE RECORDING RESERVATIONS OVER A TELEPHONE LINE

[75] Inventor: Kazuo Hashimoto, Tokyo, Japan

[73] Assignee: Hashimoto Corporation, Tokyo, Japan

[21] Appl. No.: 275,718

[22] Filed: Jul. 19, 1994

Related U.S. Application Data

[63] Continuation of Ser. No. 53,770, Apr. 29, 1993, abandoned.

[30] Foreign Application Priority Data

May 1, 1992 [JP] Japan .................. 4-137573

[51] Int. Cl.⁶ .......................................... H04M 11/00
[52] U.S. Cl. .................................. 379/102; 379/104; 348/734
[58] Field of Search .................. 379/102, 104–106, 379/67, 88, 89; 340/825.69, 825.72; H04N 5/44; 348/734

[56] References Cited

U.S. PATENT DOCUMENTS

| | | | |
|---|---|---|---|
| 4,540,851 | 9/1985 | Hashimoto | 379/105 |
| 4,625,080 | 11/1986 | Scott | 379/104 |
| 4,656,655 | 4/1987 | Hashimoto | 379/105 |
| 4,829,555 | 5/1989 | Hashimoto | 379/102 |
| 4,841,562 | 6/1989 | Lem | 379/105 |
| 4,899,370 | 2/1990 | Kameo | 379/104 |
| 5,216,228 | 6/1993 | Hashimoto | 379/102 |

FOREIGN PATENT DOCUMENTS

| | | | |
|---|---|---|---|
| 2005070 | 6/1990 | Canada | 358/194.1 |
| 61-95658 | 5/1986 | Japan | 379/102 |
| 852166 | 4/1986 | United Kingdom . | |

Primary Examiner—Wing F. Chan
Attorney, Agent, or Firm—Lowe, Price, LeBlanc & Becker

[57] ABSTRACT

A remotely controlled device for making videotape recording reservations on a videocassette recorder using a remote pushbutton telephone to enter recording reservation codes such as PlusCodes, constructed so that the audio portion of the TV program currently being recorded can be monitored by the user via the telephone whenever the user calls up the device. Prior to the inputting of the recording reservation codes, the user may turn off the transmission of the audio portion of the TV program by transmitting a specific code in order to ensure that the audio portion of the TV program does not mask the sound of DTMF tones during inputting of reservation codes.

5 Claims, 3 Drawing Sheets

DEVICE FOR MAKING VIDEOTAPE RECORDING RESERVATIONS OVER A TELEPHONE LINE

This application is a continuation of application Ser. No. 08/053,770, filed Apr. 29, 1993, now abandoned.

BACKGROUND OF THE INVENTION

The present invention relates to a device which utilizes an outside telephone to perform the scheduling of videotape recording of TV programs based on G-codes (in the United States, Plus-Codes or the like).

Heretofore, whenever a telephone was utilized to make reservations for the videotape recording of TV programs, the remote control signals (DTMF tones) transmitted by the telephone which are used to enter subsequent reservations often could not reach the TV program reservation device correctly due to interference (masking) caused by the audio of the TV program being recorded on the videocassette recorder (VCR).

SUMMARY OF THE INVENTION

This invention is directed to provide a means for correctly transmitting the above mentioned remote control signals based on G-codes for TV program reservations.

This invention enables remote control signals based on TV program G-codes to be transmitted correctly when the VCR is in recording operation and the audio of the TV program being recorded is transmitted to an outside telephone as a monitoring means, by using a specific DTMF tone to stop the transmission of the above audio before transmitting the G-codes through the outside telephone.

Figure 1:
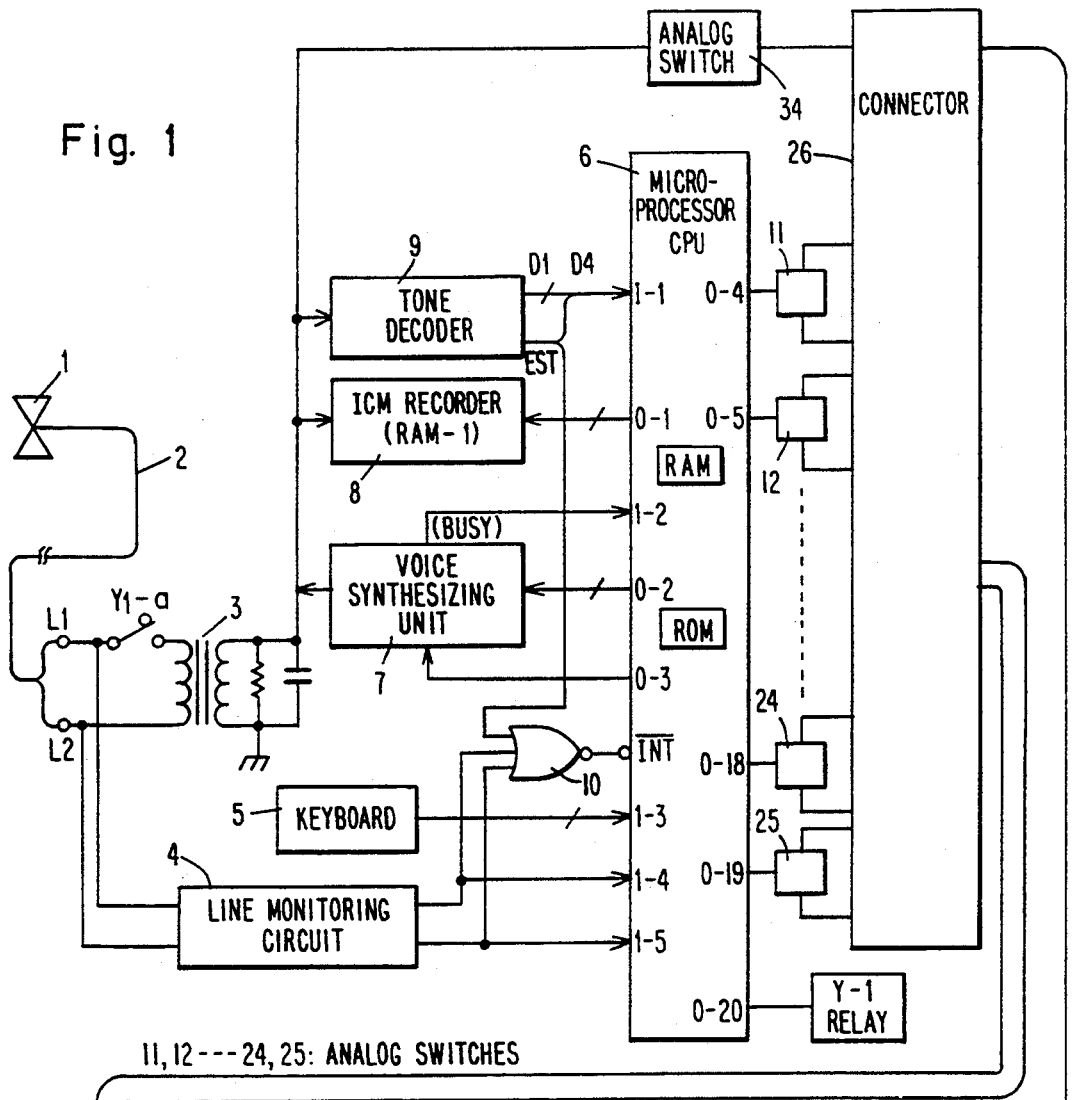
FIG. 1 is a block diagram illustrating an embodiment of the present invention.
Figure 1:
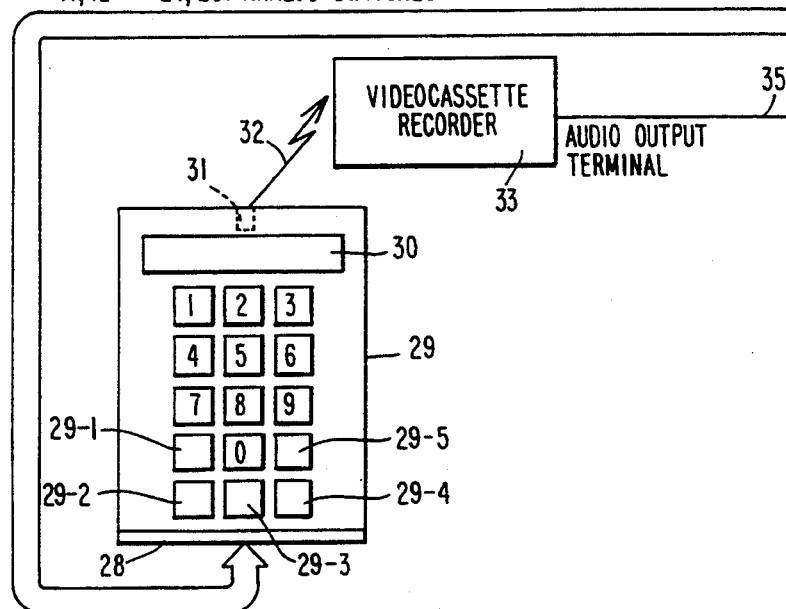

(Legend)
1. Telephone set
2. Telephone line
3. Line transformer
4. Line monitoring circuit
5. Keyboard
6. Microprocessor CPU
7. Voice synthesizing unit
8. ICM recorder
9. Tone decoder
10. NOR gate
11~25. Analog switches
26. Connector
27. Cable
28. Connector
29. Remote control box
30. Display unit
31. Light emitting diode
32. Infrared ray
33. Videocassette recorder
34. Analog switch
35. Cable

DESCRIPTION OF THE PREFERRED EMBODIMENT

In the next paragraph, the construction and operation of the present invention will be explained. FIG. 1 is a block diagram illustrating one of the preferred embodiments of this invention. In the diagram, the number 1 indicates an unspecified outside telephone; number 2 is the telephone line; 3 is a line transformer; 4 is a line monitoring circuit which detects ringing signals and changes in the telephone line's voltage when the caller concludes a phone call and places the phone on-hook; 5 is a keyboard which has various keys to create the operating modes; 6 is a one chip microprocessor (CPU) having a built-in read-only memory (ROM), in which the program is stored, and a built-in random-access memory (RAM), in which the G-codes based on DTMF tones sent through the telephone line are temporarily stored.

Incidentally, the aforementioned G-codes are TV program reservation code numbers, which have been lately put into effect in a Japanese newspaper, "The Asahi."

Number 7 is a voice synthesizing unit, which transmits by voice synthesis an outgoing message or other messages to give callers instructions on remote control push-button operations. Number 8 is an ICM recorder comprising RAM-1 for recording incoming messages from callers. Number 9 is a tone decoder which decodes the DTMF tones sent through telephone line 2. Number 10 is a NOR gate which is connected to the interrupt terminal $\overline{\text{INT}}$ of CPU 6. Numbers 11 through 25 are analog switches which are used for short-circuiting the terminals attached to the various buttons on the remote control box described below. Numbers 26 and 28 are connectors. Number 27 is a cable, and construction is such that it is possible to directly connect 26 and 28 without using 27.

Number 29 is a remote control box (remote control signal transmitting apparatus). As shown in the diagram, 0 through 9 are numbered buttons to be used for entering the G-codes. Number 29-1 is a "Cancel" button which is used for cancelling the already scheduled G-codes. Number 29-2 is a "Weekly" button used for weekly scheduling. Number 29-3 is a "Once" button which is used for making a one-time reservation. Number 29-4 is a "Daily" button which is used for daily reservations. Number 29-5 is a "Review" button which is used for reviewing the entered reservations by means of display unit 30. This remote control box also has a light emitting diode (LED 37) which radiates infrared ray 32 when the scheduled recording time arrives. Number 33 is a VCR which is controlled by the above-mentioned infrared ray 32. The VCR's audio output. terminal is connected to telephone line 2 in such a manner that the audio is transmitted to telephone line 2 via cable 35, analog switch 34, and line transformer 3 (either a pin jack or a headphone output terminal can be used as the audio output terminal).

Figure 2:
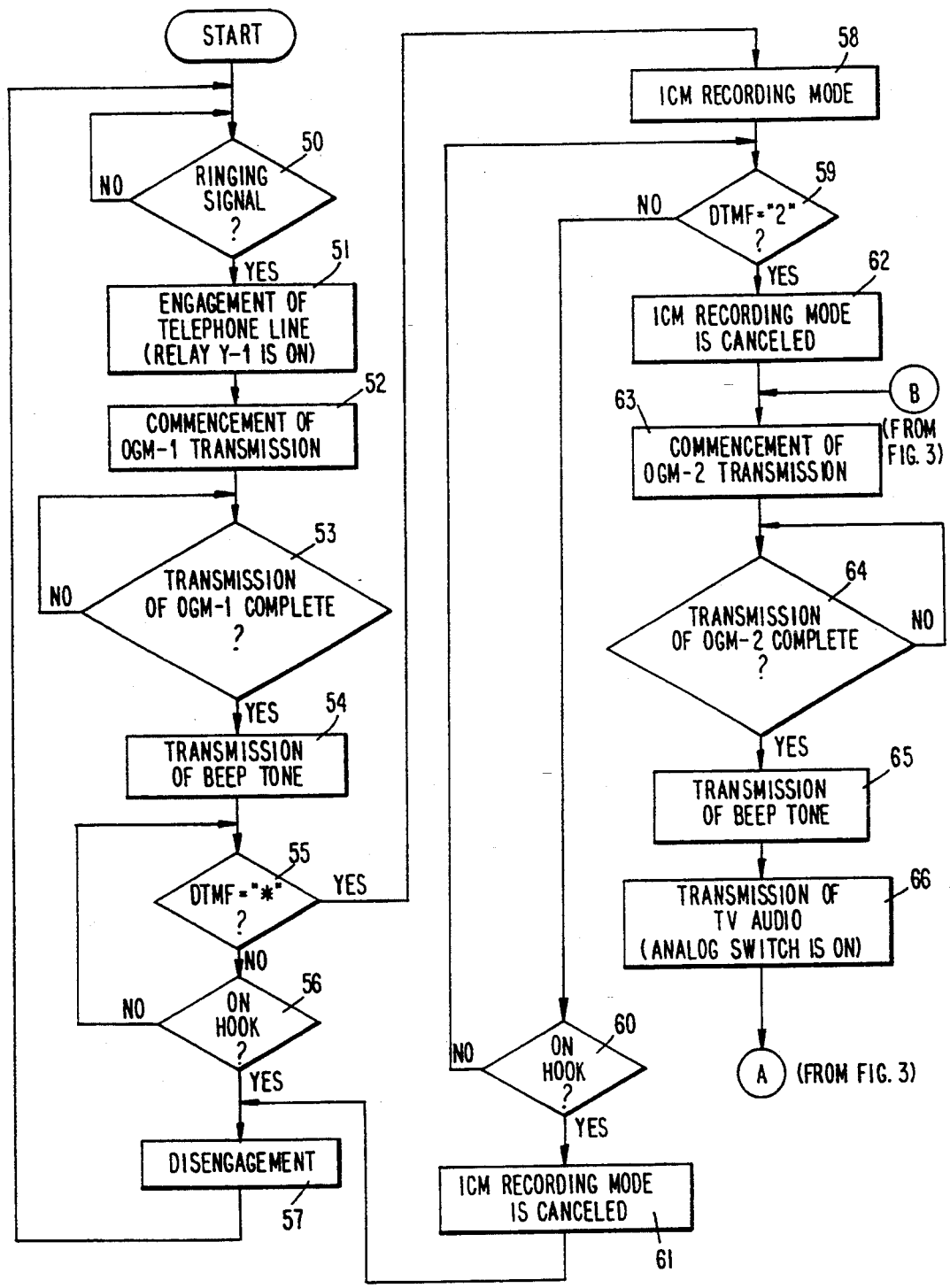
FIG. 2 is a flowchart illustrating the operations prior to and including the registration of TV program reservations based on the G-codes through an outside telephone.
Figure 3:
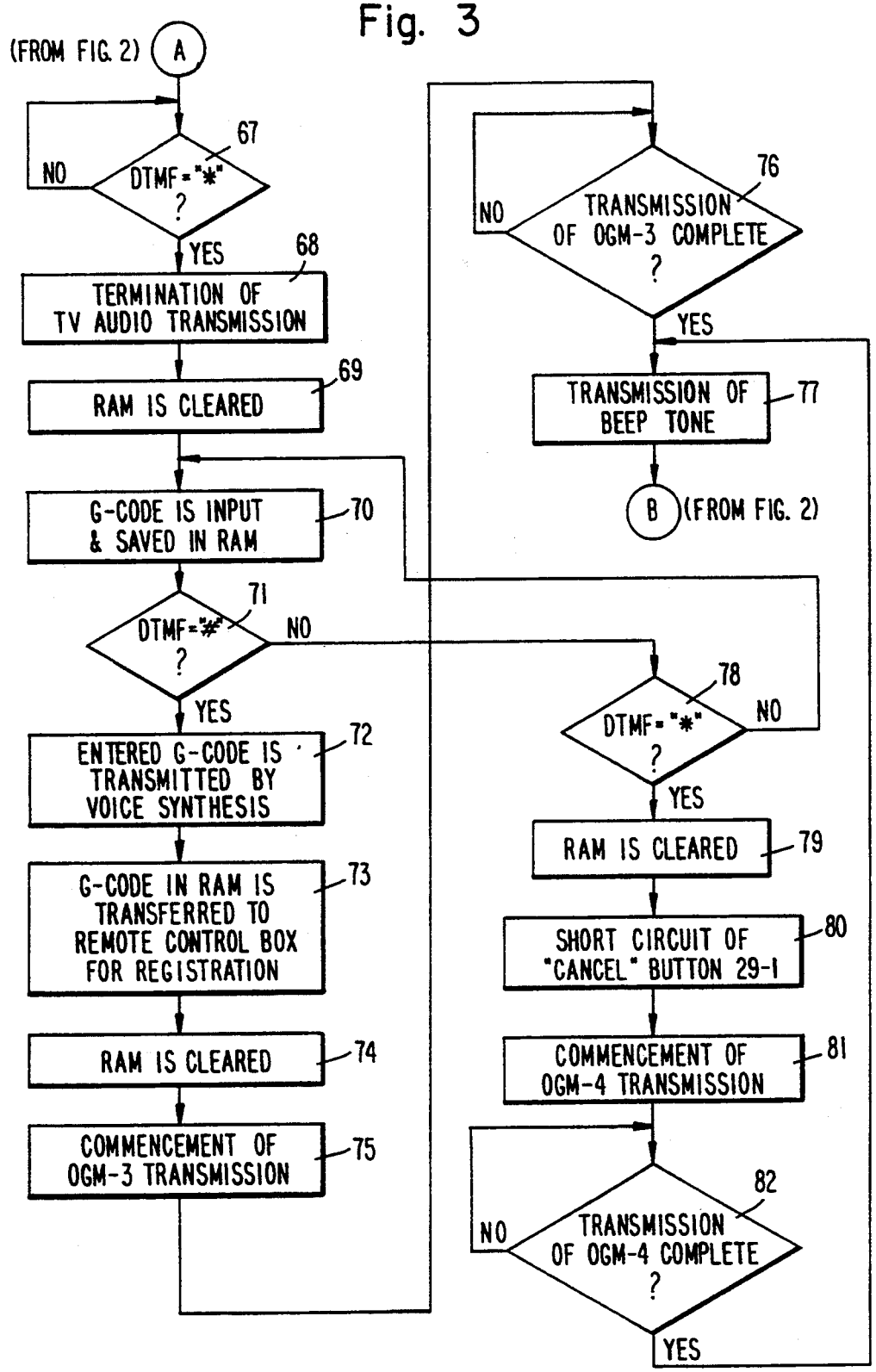
FIG. 3 is a flowchart illustrating the operations prior to and including the registration of TV program reservations based on the G-codes through an outside telephone.

Next, using the flowchart shown in FIG. 2 as a reference, the operation will be described concretely. If keyboard 5's "Absent" key (not shown) is pressed, the program stored in CPU 6's ROM advances to Step 50 of the flowchart in FIG. 2 and waits for the arrival of a ringing signal (waiting mode). Here, if there is a call and the ringing signal is detected by the program through line monitoring circuit 4 and input port 1-4, Step 50 affirmed. At Step 53, the load relay Y-1 of output port 0-20 is maintained in operating condition. Accordingly, relay Y-1's contact y-1a a closes, the telephone line is engaged via line transformer 3 causing the ringing signal to stop, and a communication mode between telephone line 1 and the present device begins.

In accordance with a command, from output port 0-2 (multiple bit), a first outgoing message OGM-1 (not shown) is chosen from voice synthesizing unit 7, and a start signal from output port 0-3 triggers the transmission of OGM-1 (Step 52). An example of this message would be "Hello, this is Hashimoto. I'm not available right now. Please press the asterisk (*) key on your telephone and leave your message after you hear the beep."

The program tests for the conclusion of the above outgoing message (OGM-1) via input port 1-2. Accordingly, when OGM-1 has concluded, Step 53 is affirmed and a beep tone is sent from the voice synthesizing unit 7 at Step 54.

At Step 55, a test takes place whether a caller sent a DTMF tone representing the asterisk (*) by pressing the asterisk key according to the above mentioned outgoing message (OGM-1). When the above DTMF tone is detected by the program through tone decoder 9, Step 55 is affirmed, and at Step 58, ICM recorder 8 is set to a recording mode. Accordingly, an incoming message from the caller is recorded in the RAM of ICM recorder 8. When the device is in the recording mode, negative results of Steps 59 and 60 form a loop. However, when the caller puts telephone set 1 on hook, the program detects the change in the telephone line voltage via line monitoring circuit 4. Then, Step 60 is affirmed, ICM recording mode is cancelled (Step 61), the telephone line is disengaged (Step 57) and the program is returned to a standby mode at Step 50.

If, on the other hand, tile caller is the owner of the present device, when a previously determined code, for example the DTMF tone "2" is sent during recording mode, it is detected by means of tone decoder 9 and Step 59 is affirmed. Here ICM recording mode is cancelled (Step 62) and the transmission of a second outgoing message (OGM-2) is commenced (Step 63). An example of what would be recorded as OGM-2 would be "Hello. You have reached the G-code input device. After you have entered a G-code, please press the pound (#) key. If you make a mistake while entering a G-code, press the asterisk key to cancel it, and then press the pound key after you have entered the correct G-code." After this message is transmitted, a beep tone will be transmitted (Steps 64 & 65), and in response to a command from output port 0-21, analog switch 34 is turned on. Accordingly, if VCR 33 is in operation at this time, TV audio is transmitted from the VCR audio output terminal to the caller through connector 26, analog switch 34 and line transformer 3.

The next step for the caller is to transmit a G-code. However, if VCR 33 is in operation, the above TV audio often masks the sound of the G-code. Therefore, in order to prevent interference with proper G-code input, this embodiment is constructed such that the caller presses the asterisk key whenever he or she hears the television audio. The presence of this DTMF tone is tested at Step 67, and if there is an affirmative result, analog switch 34 is turned off, thereby terminating transmission of the TV audio (Step 68). Then the RAM is cleared at Step 69. The reason for this is as follows: if the TV audio contains a frequency corresponding to that of the DTMF tone, the frequency is stored in the RAM and inadvertently alter the G-code, whereby correct reservations of TV programs are hindered. Then, the caller transmits the G-code. As a G-code is composed of multiple digits, the G-code is stored in the RAM one digit at a time as the RAM addresses are successively incremented (Step 70).

The pound key is pressed after the aforementioned G-code was transmitted to the aforementioned RAM, Step 71 becomes affirmed. Then, the G-code stored in the RAM is read one digit at a time and is transmitted to the caller by voice synthesis (Step 72). The G-code is also transferred to remote control, box 29 via the analog switches 11-25 corresponding to the digits of the G-code (for example: if one of the G code's digits is "1" the terminal of the remote control box's "1" button is short-circuited. This automatic operation is successively performed until the digits of the G-code are completely transferred to remote control box 29). Then the entering process is concluded by short-circuiting the terminal of "Once" button 29-3, which makes a one-time reservation. This particular instance is limited to a one-time TV program reservation, but it is also possible to make daily reservations if the pound sign (#) is pressed twice, and weekly reservations if the pound sign is pressed three times.

After the completion of TV program reservation to remote control box 29 in the above manner, the old G-code in the above-mentioned RAM is cleared to allow the next G-code to be stored (Step 74). The third outgoing message (OGM-3), "This G-code has been entered," and a beep-tone are subsequently transmitted (Steps 75, 76, 77).

Furthermore, not only is it possible to transfer an entire G-code in the RAM to remote control box 29 by pressing the pound key as stated above, it is also possible to program the transference of a G-code to remote control box 29 one digit at a time. Also, it is possible to announce to the caller by voice synthesis the number of the digit every time a digit of the G-code is transmitted.

After the beep tone has been sent at Step 77, the program returns to the above-mentioned Step 63 and reservations for the next TV program can be performed.

On one hand, if the caller notices during input that the G-code is incorrect as stated above, he or she presses the asterisk key, thereby affirming Step 78, and the RAM in which the G-code is stored will be cleared (Step 79). Again, the above G-code which has also been entered into remote control box 29 shortly before can be deleted by short-circuiting the contacts of "Cancel" button 29-1, This remote control box 29 is constructed such that a G-code may be deleted by pressing the "Cancel" button 29-1, as long as the G-code has been entered within the past 30 seconds.

At the next Step 81, the fourth outgoing message (OGM-4), "This G-code has been cancelled," is sent. Then, the beep tone is also sent at Step 77 and the program returns to Step 63. At this point, inputting of the correct G-code becomes possible.

When telephone 1 is placed on-hook after the completion of G-codes input, the present device is restored to a standby mode in response to an interrupt signal from line monitoring circuit 4 (although the interruption is not shown in the flowchart).

This invention should not be limited to the above embodiment. It goes without saying that. conceptually this invention allows for a variety of embodiments. For example, it is possible to have all the circuits shown in FIG. 1 within the VCR. In this case, LED 31 is not required because remote control box 29 and the VCR will be directly connected.

In this device, the caller, following instructions from the voice synthesizing unit 7, uses an outside touch-tone phone to make reservations of TV programs on his or her VCR based on the G-codes. If the VCR is in operation at that time and the caller hears the audio of the program being recorded through the telephone line, proper G-code input is often obstructed. However, if the G-codes are entered after terminating the transmission of the TV audio from the VCR by sending a previously determined code, scheduling of videotape recording becomes a reliable procedure. Thus, the practical effect of the present invention is very important.

I claim:

1. A remotely controlled device associated with a video cassette recorder (VCR) for making videotape recording reservations over a telephone line, comprising:

means for establishing a telecommunication path between a remote terminal and the VCR over the telephone line;

means for transmitting program audio signals produced by said VCR to the remote terminal over the telephone line;

means responsive to a first remote control signal sent by said remote terminal to terminate transmission of said audio signals by said VCR to said remote terminal over said telephone line;

means responsive to said first remote control signal for receiving a code word representing in a VCR-plus type code a desired TV program to be recorded, and for storing said code word;

control means remote with respect to said VCR and responsive to a second remote control signal sent by said remote terminal for controlling said VCR to make a videotape recording reservation; and means responsive to said second remote control signal for transferring said stored code word to said control means and responsive to said first remote control signal for clearing said receiving means.

2. The device of claim 1, wherein said first remote control signal is an asterisk (*) DTMF tone.

3. The device of claim 1, wherein said remote terminal comprises a DTMF telephone set.

4. The device of claim 1, including a voice synthesizer unit for sending voice instructions to the remote telephone set.

5. The device of claim 1, further comprising adapting means for enabling the control means to respond to a VCR-Plus type code signal.

* * * * *